United States Patent [19]

Langlois et al.

[11] Patent Number: 5,295,183
[45] Date of Patent: Mar. 15, 1994

[54] CONGESTION CONTROL SYSTEM FOR TELECOMMUNICATIONS

[75] Inventors: Francis Langlois, Outremont, Canada; France Caron, Madrid, Spain; Jean M. Regnier, Laval, Canada

[73] Assignee: Northern Telecom Limited, Montreal, Canada

[21] Appl. No.: 795,601

[22] Filed: Nov. 21, 1991

[51] Int. Cl.$^5$ .................... H04M 3/36; H04M 7/06
[52] U.S. Cl. ............................ 379/113; 379/196; 379/221; 379/230
[58] Field of Search .............. 379/221, 220, 113, 112, 379/134, 137, 196, 197, 198, 224

[56] References Cited

U.S. PATENT DOCUMENTS

| | | | |
|---|---|---|---|
| 4,284,852 | 8/1981 | Szybicki et al. | 379/221 |
| 4,756,019 | 7/1988 | Szybicki | 379/112 |
| 4,991,204 | 2/1991 | Yamamoto et al. | 379/221 |
| 5,068,892 | 11/1991 | Livanos | 379/221 |
| 5,142,570 | 8/1992 | Chaudhary et al. | 379/221 |

Primary Examiner—Thomas W. Brown
Attorney, Agent, or Firm—Dallas F. Smith

[57] ABSTRACT

A congestion control system is provided which is an enhancement of the dynamic call routing system taught by Szybicki et al. in U.S. Pat. No. 4,284,852. The congestion control system includes two parts, a restrictive control and an expansive control. The restrictive control uses data collected by the network processor to provide a call gapping recommendation which is automatically updated each cycle (typically 10 seconds). The call gapping recommendation is used to restrict entry of calls to the network. The expansive control system uses a call compression factor to deflect tandem traffic from overloaded nodes. If direct traffic continues to increase, the restrictive control takes over from the expansive control.

12 Claims, 7 Drawing Sheets

CONGESTION CONTROL SYSTEM FOR TELECOMMUNICATIONS

This invention relates to congestion control for a telecommunications system and is particularly concerned with such control based upon a dynamic traffic control system which provides origin and destination switching office status information to a central processor.

A system proposed by Szybicki et al. in U.S. Pat. No. 4,284,852, issued Aug. 18, 1981 to Northern Telecom Limited alleviates some of the problems of traditional regimented hierarchical type of routing by grouping a plurality of switching offices (e.g. class 5 stored program control offices) into clusters and by providing each switching office with direct trunks to all (or most of) the other switching offices in its cluster. This then allows each switching office in the cluster to serve the dual function both of an originating (or terminating) office and of a tandeming office for its own cluster. While the system of Szybicki et al. is able to deal with normal overflow traffic situations effectively, extreme traffic conditions, such as a focussed overload situation may cause the direct traffic to exceed system capabilities. Focussed overloads occur, for example when news of a disaster in a particular location causes a high level of calls to be directed into the stricken area. In this event the direct traffic is sufficiently high to fully occupy the system, and schemes such as Szybicki et al. which deal adequately with normal overload conditions have no mechanism for limiting direct traffic. This is a particularly acute problem as the disaster enhances the need for effective communication out of the stricken area.

An object of the present invention is to provide improved congestion control for a telecommunications system.

In accordance with one aspect of the present invention there is provided in a telecommunications network having a plurality of switching offices interconnected by trunks and connected to a central processor for periodically exchanging data to effect dynamic call routing, a method of congestion control comprising the steps of: each update cycle, receiving data, from the switching offices, indicative of occupancy of network resources; determining from the data whether there are destinations within the network to which access is to be restricted; establishing an alert status for each of the restricted destinations; calculating, for each of the restricted destinations, an interval of time to be left between calls entering the network that are directed thereto and referred to as a call interarrival time; and sending, to the switching offices, an identification for each of the restricted destinations, together with the alert status and the call interarrival time therefor.

In accordance with a further aspect of the present invention there is provided in a telecommunications network having a plurality of switching offices interconnected by trunks and connected to a central processor for periodically exchanging data to effect dynamic call routing, a method of congestion control comprising the steps of: each update cycle, receiving data, from the switching offices, indicative of occupancy of network resources; for each origin-destination pair of the plurality of switching offices, recommending a tandem switching office in dependence upon occupancy of trunks to the switching office and CPU occupancy of the switching office; determining from the data whether there are destinations within the network to which access is to be restricted; establishing an alert status for each of the restricted destinations; calculating a call interarrival time for each of the restricted destinations; and sending, to the switching offices, an identification for each or the restricted destinations, together with the alert status and the call interarrival time therefor.

The present invention will be further understood from the following description with reference to the drawings in which:

FIG. 1 illustrates a known telephone switching network;

FIG. 2 graphically illustrates a time line for a single switch of FIG. 1;

FIG. 3a graphically illustrates the effect of the method of congestion control, in accordance with an embodiment of the present invention, on resource occupancy;

FIG. 3b graphically illustrated the effect of the method of congestion control, in accordance with an embodiment of the present invention, on call flow;

FIG. 4 illustrates, in a flow chart, the method of congestion control, in accordance with an embodiment of the present invention, implemented by the network processor;

FIG. 5 graphically illustrates a timing diagram for communication between the network and the network processor;

Figure 8:
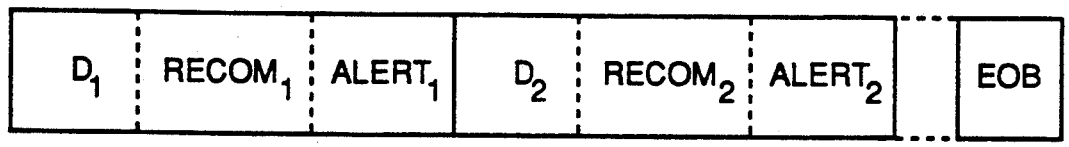
Figure 9:
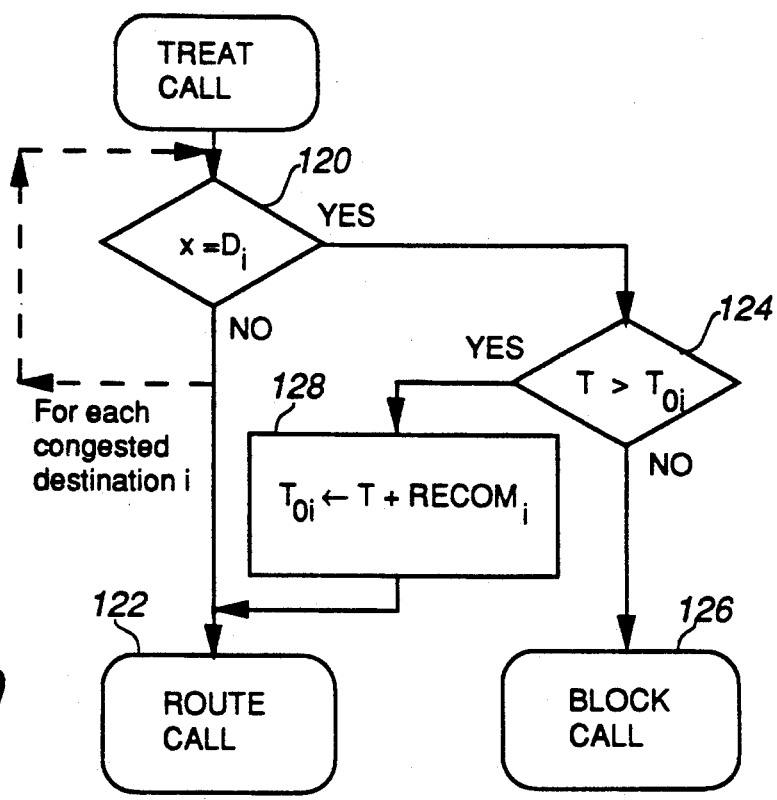
Figure 10:
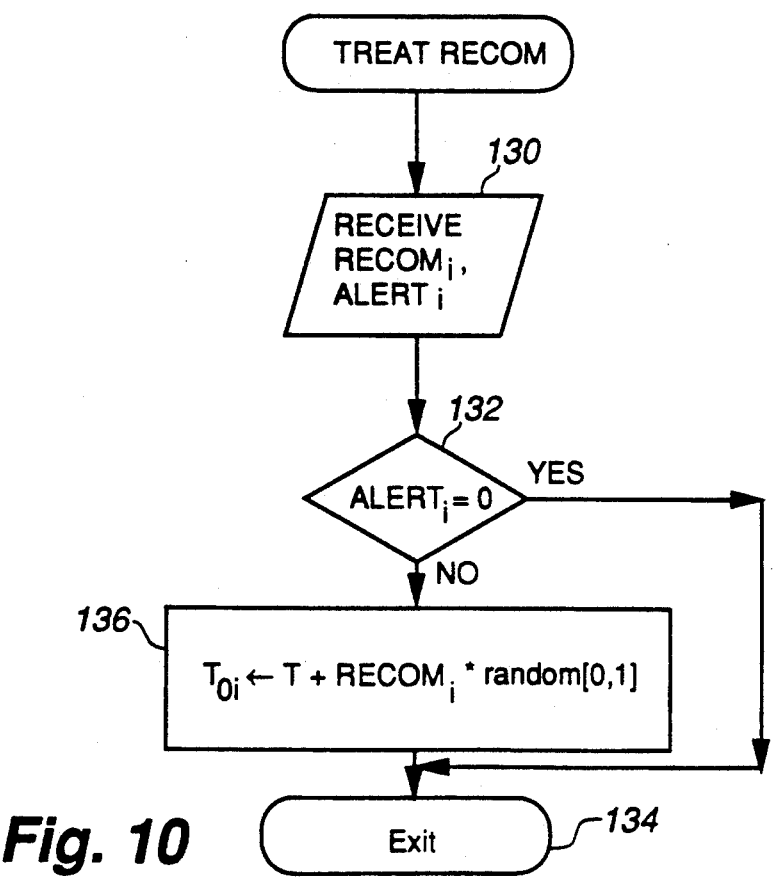
Figure 11:
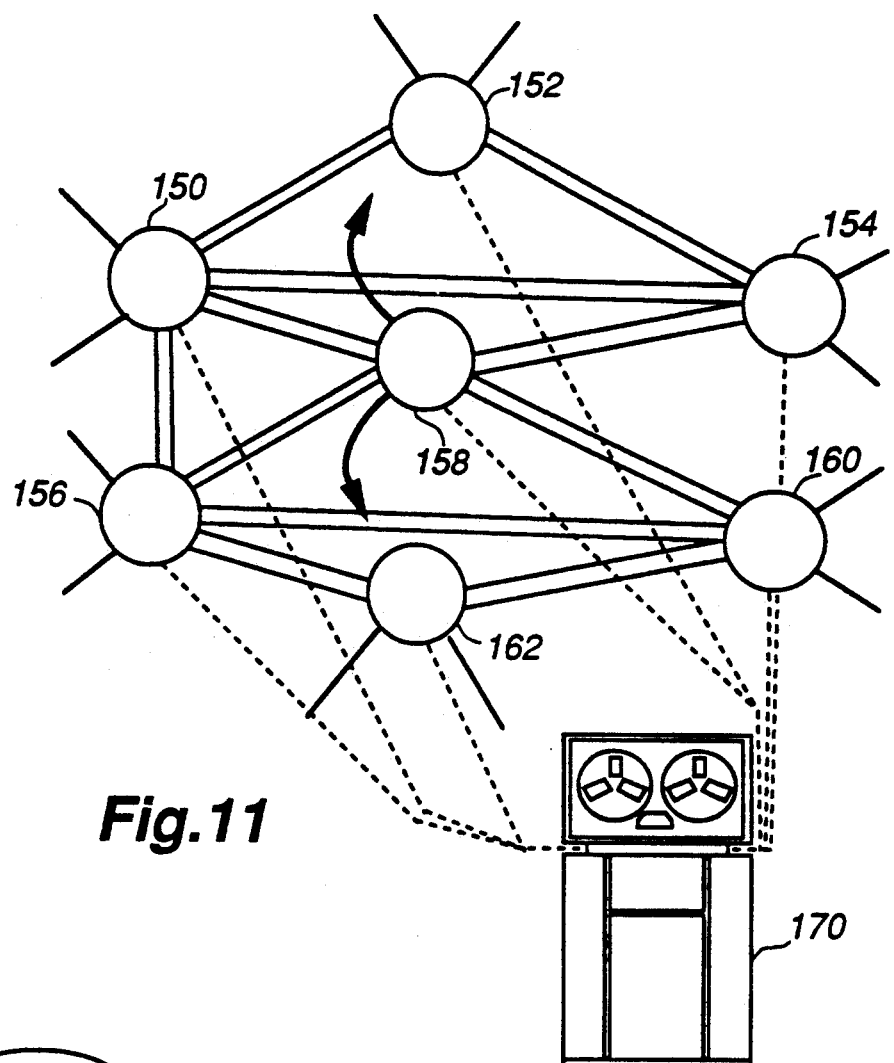
Figure 12:
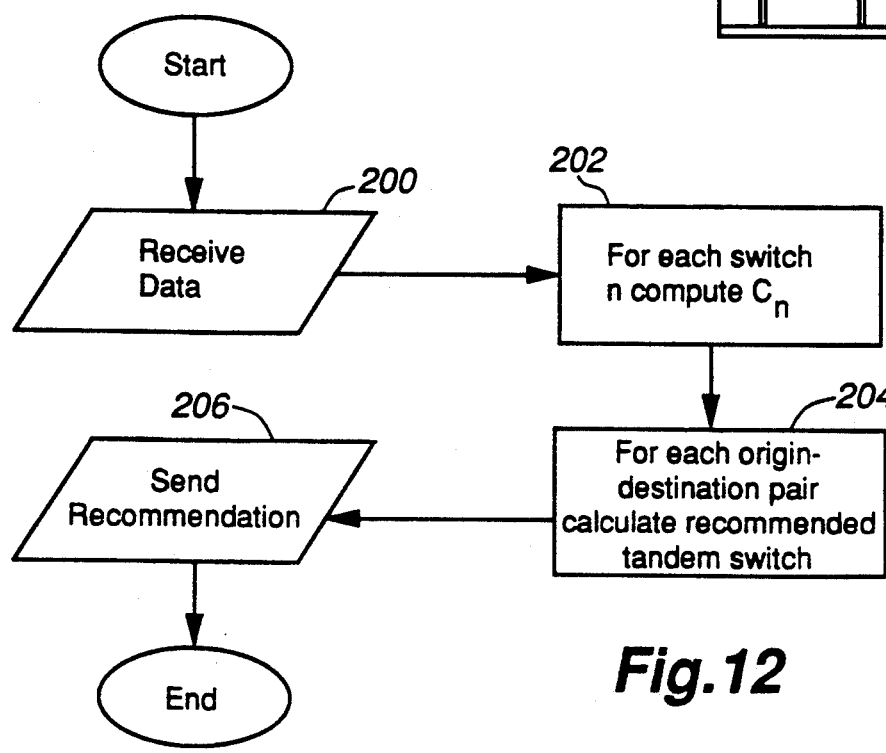

FIG. 8 graphically illustrates the format of the recommendations sent to the switches by the network processor;

FIG. 9 illustrates, in a flow chart, the method of applying the recommendation at the switch;

FIG. 10 illustrates, in a flow chart, updating the release time when a switch receives a update;

FIG. 11 illustrates the effect of the expansive control system on a network; and FIG. 12 illustrates, in a flow chart, the steps taken by the expansive control system., in accordance with an embodiment of the present invention.

Figure 1:
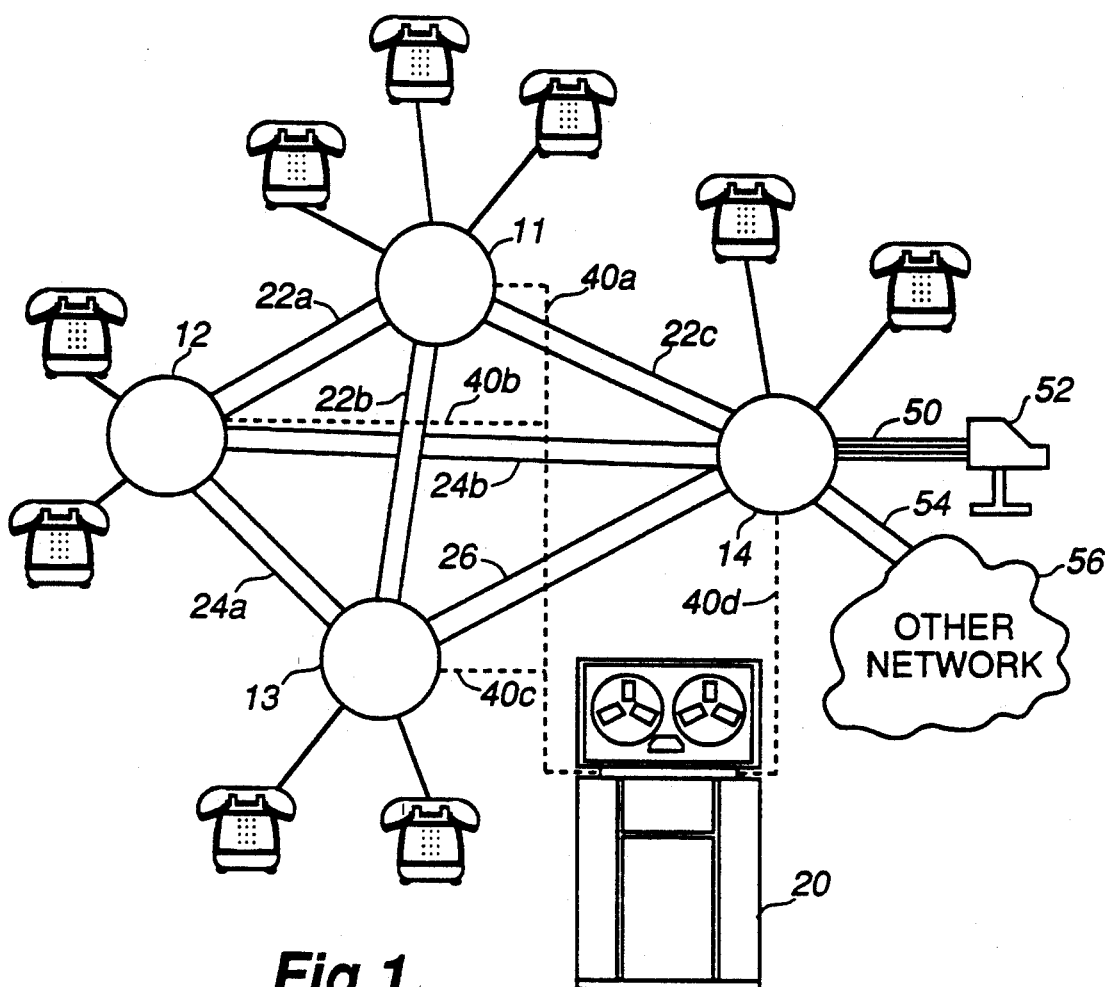

Referring to FIG. 1, there is illustrated a known telephone switching network including local switching offices 11, 12, 13, and 14 interconnected and functioning under the control of a network processor 20 that provides a dynamic call routing system (DCR). The DCR system is disclosed in Szybicki et al. in U.S. Pat. No. 4,284,852, issued Aug. 18, 1981 to Northern Telecom Limited, the entire disclosure of which is hereby incorporated by reference. Direct outgoing trunk groups 22a, 22b, 22c, 24a, 24b, and 26 are employed from each switching office 11, 12, 13, and 14 to every other switching office 11, 12, 13, and 14 under the supervision of the network processor 20. The network processor 20 receives information from switching offices 11, 12, 13, and 14 and transmits information to switching offices 11, 12, 13, and 14 via data links 40a, 40b, 40c, and 40d, respectively.

The information that the network processor 20 receives from switching offices 11, 12, 13, and 14 is information regarding how busy each switching office is. The information required (both directly measured data and derived data) includes the number of trunks in a considered outgoing trunk group, the number of occupied (busy) trunks in the considered outgoing trunk group, the total average call intensity for the considered outgoing trunk group, the average time per conversation, the time period over which the information is collected, and the expected number of idle trunk lines needed in the trunk group for other than alternately routed calls. Employing this information, the network processor 20 determines the most likely alternate routes between the switching offices 11, 12, 13, and 14 and stores the alternative route information for a particular switching office at that particular switching office. This alternate route information is periodically updated to ensure that it is current (e.g. every 5 to 15 seconds the alternate route data is updated). The frequency of this updating of the alternate route data is a design variable dependent upon the number of switching offices in the alternate routing configuration, upon the amount of traffic being handled (i.e. in busy time periods it is desirable to update the alternate route information more frequently than otherwise), upon the speed of transmission of the data between the switching offices and the network processor 20, along data links 40a, 40b, 40c, and, 40d, upon the speed of the network processor 20 and upon design philosophy.

In accordance with the present invention, the dynamic call routing system is enhanced to provide a congestion control system. The congestion control system uses the information provided to the network processor to effect congestion control within the network. Additional information sent by switching offices include an estimate of the occupancy of limited or bottleneck resources. These bottleneck resources include switch CPU, a group of telephone lines 50 to a commercial subscriber 52, and a trunk group 54 to another network 56. Upon receipt of the bottleneck resource occupancies, the network processor determines whether or not calls should be blocked from entering the network. If action is necessary, the network processor sends a recommendation back to the switches which limits the calls. The feedback process thus established continues cycle after cycle, progressively adjusting the flow to prevent calls with low probability of completion from entering the network, while maintaining resource occupancies around their optimum value.

The recommendation that the network processor sends to the switch is a minimum interval of time to be left between calls entering the network towards a target subscriber or switch. A target subscriber is a network subscriber that may cause focused overloads by attracting multiple calls in short time periods. Examples are, a radio station running a contest in which listeners must call in after hearing a particular song, a power utility during a blackout, and emergency services during a disaster such as a tornado or an earthquake. A known form of this type of control is so-called call gapping. In traditional call gapping, a network operator will enter a call gap interval once an overload situation is identified. With the present invention the call gapping recommendation automatically results from analysis of the network data by the network processor 20.

Figure 2:
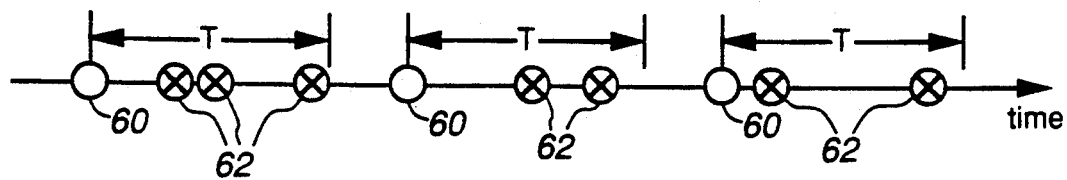

Referring to FIG. 2 there is graphically illustrated a time line for a single switch of FIG. 1. Calls launched into the network are indicated by circles 60. Calls blocked from entering the network by the switch are indicated by crossed circles 62. Before a call 60 is launched to the saturated subscriber or switch, the originating switch must verify that the recommended interval T has elapsed since the last such call 60 has entered the network. If not the call is blocked 62. Interarrival time control explicitly upper bounds the flow originating from the switches. The upper bound is inverse of the interarrival time T.

Figure 3A:
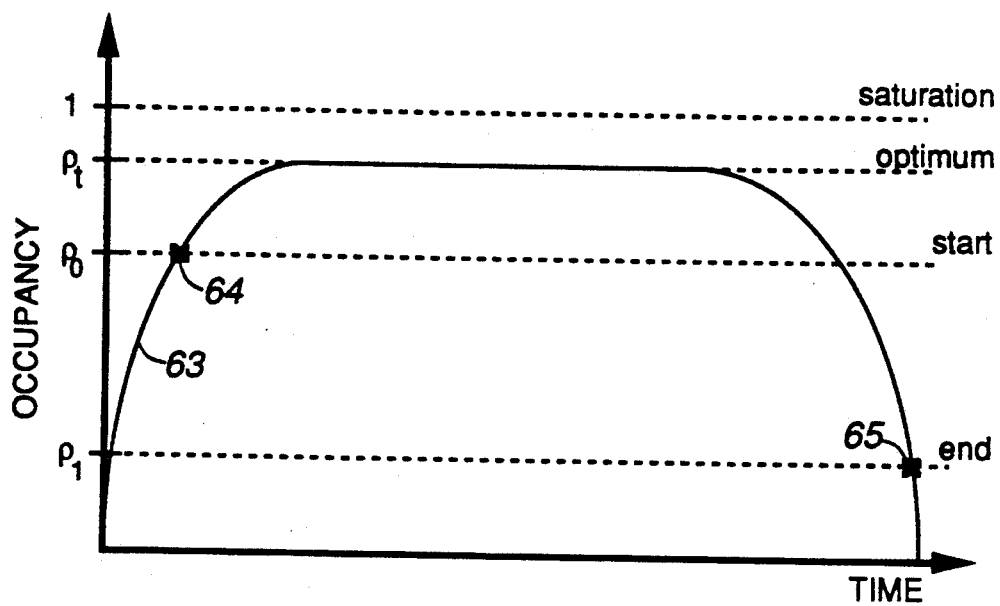
Figure 3B:
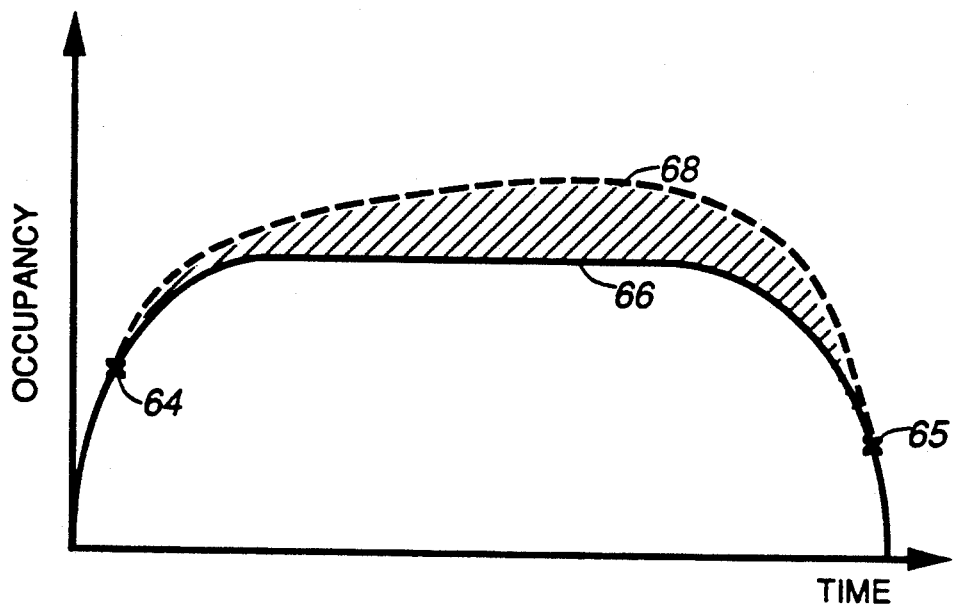

Referring to FIG. 3a and 3b, there are graphically illustrated the effect of the method of congestion control on resource occupancy and call flow, respectively. A customer caused surge is illustrated as an example. The sudden increase in calls to a target subscriber causes the occupancy 63 to increase rapidly. When the network processor finds that the occupancy exceeds a predetermined threshold $\rho_0$ an alert is initiated 64. The network processor begins sending recommendations limiting the number of calls entering the network. A solid line 66 in FIG. 3b shows the flow of calls that are accepted (launched) into the network, while a broken line 68 indicates the number of calls offered to the network. The hachured area between lines 66 and 68 represents the number of calls blocked at their origin. The blocked calls would consume network resources with low probability of reaching their destination (since the target subscriber's standard is nearly saturated). When the volume of calls decreases sufficiently, the occupant drops below the threshold $\rho_1$. When this is detected by the network processor an end-of-alert message is sent 65. After receiving such a message the switches stop blocking calls to the target subscriber. From the beginning 64 through the end of the alert 65, the feedback process maintains the occupancy at the target level $\rho_t$ achieving the optimum use of network and subscriber resources. This target is resource dependent. For a switch, it is the optimal CPU consumption; for a target subscriber or trunk group, it is the saturation point, that is $\rho_t = 1$.

Figure 4:
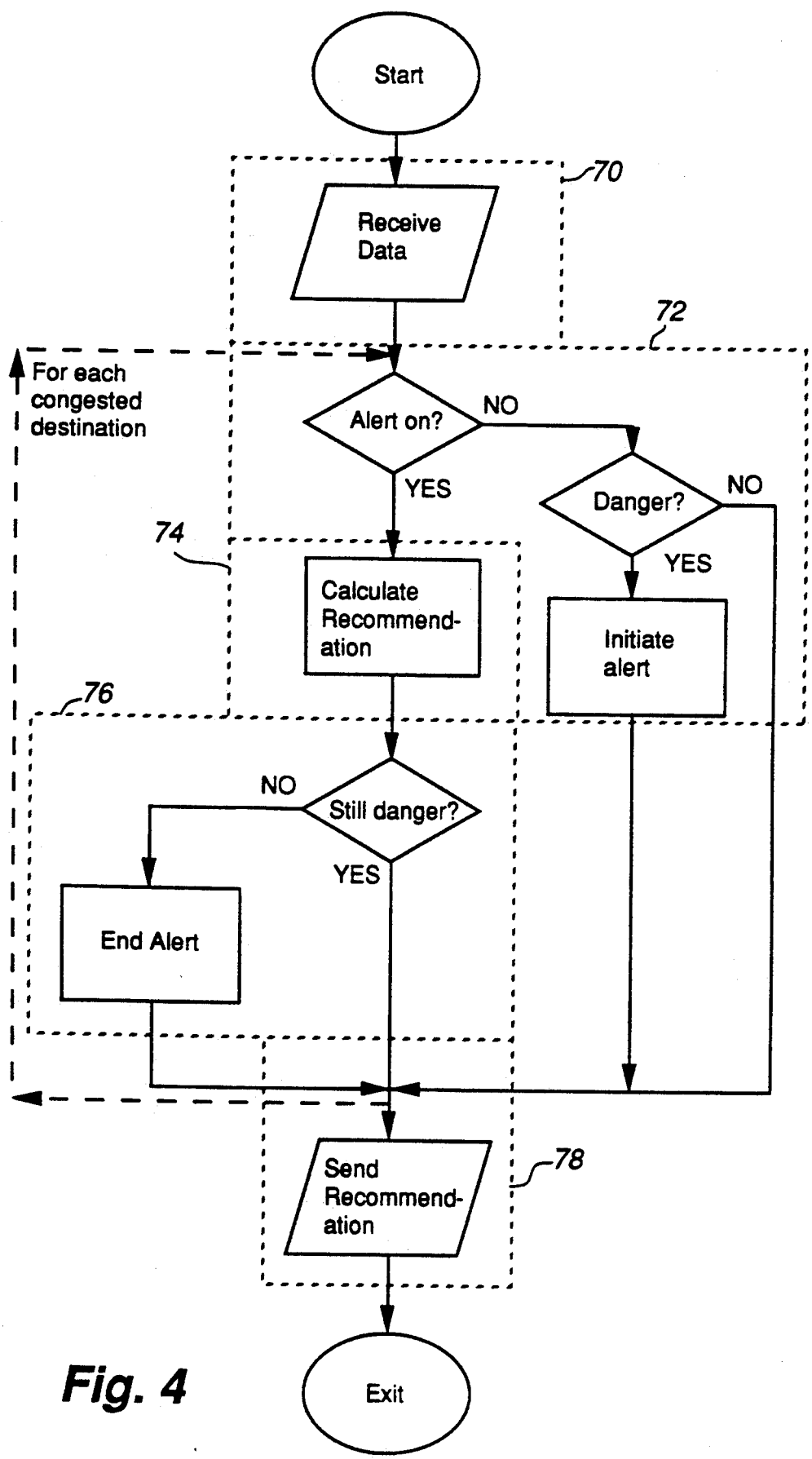

The method implemented by the network processor is illustrated in FIG. 4 in a flow chart. The process includes five tasks, indicated by broken line blocks. The tasks are the following: the reception of data 70, the initiation of an alert 72, the calculation of recommendations 74, the end of an alert 76, and the transmission of recommendations 78. Steps illustrated in FIG. 4 within the tasks are self explanatory, hence are not discussed further. However, details of the steps taken in performing the tasks are described hereinbelow with regard to FIGS. 5-8.

Figure 5:
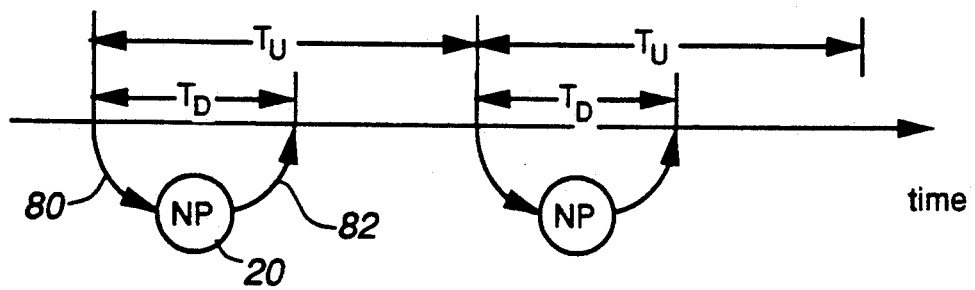

Referring to FIG. 5 there is graphically illustrated a timing diagram for communication between the network and the network processor. At the beginning of each update cycle TU, the network processor receives occupancy data from the switches as represented by arrows 80. If priority is given to the calculation of the congestion controls or if the communications between the network processor and the different switches are unsynchronized, the network processor can return its recommendations within approximately 2 seconds.

Depending on the bottleneck resource, the occupancy estimator varies. It may consist of:

a) For a target subscriber, the rate of overflowing calls, that is the number of calls per update cycle that find all the lines (or trunks) busy. This is reported to the network processor by the switch serving the subscriber. Typically, one overflowing call/second is acceptable. For target subscribers having sufficient lines and queuing capability, the line occupancy, that is number of busy lines over total number of lines, is a good estimator. In this case an occupancy of 0.9 is typical.

b) For a switch, the CPU occupancy. From it the network processor can calculate the consumption attributable to the traffic load (that is the processing of calls). Typically, a switch devotes about 85% of its CPU time to call processing.

c) For trunk groups connected to other networks, going outside the network can cause bottlenecks in which case their overflow rate is a good estimator of the channel occupancy.

d) Others, any resource capable of causing congestion can be monitored, provided it is a function of call flow for example.

Figure 6:
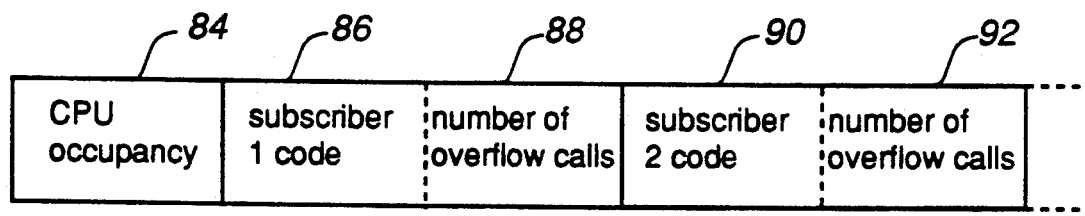
FIG. 6 illustrates an occupancy data block as received from a particular switch.

FIG. 6 illustrates an occupancy data block as received from a particular switch. It consists of a switch CPU occupancy 84, followed by an identification 86 and 90 of all active target subscribers and number of overflow calls 88 and 92 for all active target subscribers connected to the switch. Other congestion data measurements, as described above, can be appended to the block as required.

Figure 7:
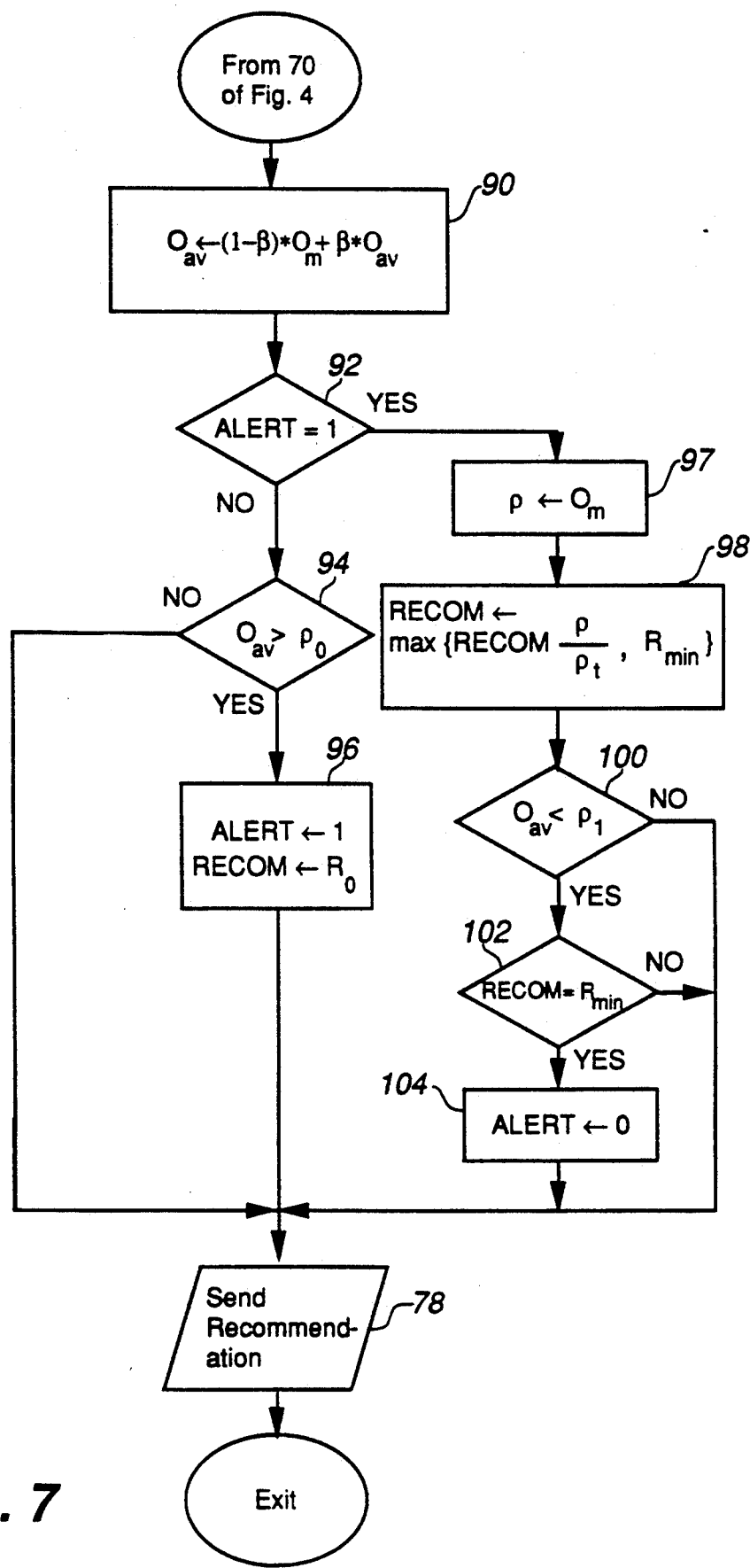
FIG. 7 illustrates, in a flow chart, the tasks of initiation of an alert, the calculation of a recommendation and the end of an alert in accordance with an embodiment of the present invention.

Referring to FIG. 7, there is illustrated in a flow chart the tasks of initiation of an alert, the calculation of a recommendation and the end of an alert. When the network processor has received the occupancy measurements of the bottleneck resources (the block 70 of FIG. 4), it determines whether of not an alert should be initiated. To do so, each measurement is averaged with those of the previous cycles, as represented by a block 90, in accordance with the moving average formula:

$$O_{av} \leftarrow (1-\beta)*O_m + \beta*O_{av}$$

and then compared against a predetermined threshold, as represented by a block 94. If the moving average is above the threshold, an alert flag is raised, as represented by a block 96, unless an alert is already on, as represented by a block 92. If the case of a sensitive subscriber is considered, for example, then parameter $O_m$ is the last measured number of overflowing calls, $O_{av}$ is the moving average, $\beta$ is the weighting factor, and $\rho_0$ is the starting overflow threshold.

While FIG. 7 illustrates the case of a single congested element, it must be clearly understood that the method is applied for every resource identified in every congestion control data block (FIG. 6). The variables are in fact array elements.

The choice of $\rho_0$ is important. If it is too low, the probability of a false alarm will increase. If it is too high, the alert could start too late. It has been found that a value of $\rho_0 = 0.85 \, \rho_t$ is generally acceptable. However, $\rho_0$ should be selected in dependence upon the device to which it is associated. For example, it should be higher for a switch CPU, since the margin between normal use and overload is relatively narrow. Similar constraints apply to the choice of $\beta$. Typically, $\beta = 0.8$ is adequate.

The recommendation calculation task of the method can be thought of in two phases, initiation and normal.

In the initiation phase (blocks 94 and 96), the first recommendation is assigned. A seed value, referred to as $R_0$ in FIG. 7 is defined as the interarrival time corresponding to the optimum call flow, once distributed among the switches of the network. The optimum call flow is that corresponding to the target occupancy $\rho_t$, as described hereinabove. Take for example, a target subscriber of a 47-switch network having 12 lines with a mean service time of 36 seconds, and assuming a target of 1 overflowing call/second. Thus (i) expected call flow at the subscriber:

$$\lambda_{exp} = \frac{12 \text{ calls}}{36 \text{ s}} + \frac{1 \text{ overflow call}}{\text{second}} = 1.33 \text{ call/s}$$

(ii) expected time between calls at each switch:

$$R_0 = 1/(\lambda_{exp}/47 \text{ switch})$$
$$= 35 \text{ seconds/call/switch}$$

Now, in the calculation phase, as represented by a block 98, the value of the previous cycle's recommendation is adjusted according to new measurements. The calculation is performed in two different ways, depending on the nature of the estimator: a) direct occupancy, or b) overflow. a) Feedback formula for direct occupancy measurement: the block 98 details the recommendation calculation task of the method of FIG. 4, for the case of a direct measurement type estimator (e.g. switch CPU consumption). The formula $$RECOM \leftarrow \max\left( RECOM * \frac{\rho}{\rho_t}, R_{min} \right)$$

embodies the feedback for the switch CPU occupancy measurement ($\rho$), as compared to the target($\rho_t$). (The value of $\rho$ is updated by a block 97 prior to the comparison, such that $\rho \leftarrow O_m$). The $R_{min}$ parameter is a floor value, preventing RECOM from becoming too low to effectively block a sudden surge in traffic. Also, $R_{min}$ keeps the system awake when traffic is high but not sufficient to sustain the occupancy target $\rho_t$. Such a situation occurs, for instance, in the decreasing portion of the line 63 of FIG. 3a between $\rho_0$ and $\rho_t$. The value of $R_{min}$ must be such that it does not hamper the response time of the system, and allows some tolerance of inaccuracy in the estimation of the service rate. A typical value is $R_{min} = 0.1 \, R_0$. b) Feedback formula for overflow measurement For the case where the estimator is the rate of calls overflowing the congested resource (e.g. trunk groups or customer lines), the formula of the block 98 of FIG. 7 is changed for the following:

$$RECOM \leftarrow \max\left( \frac{1}{[(O_t - O_m)/T_u]/z + 1/RECOM}, R_{min} \right)$$

which embodies the feedback for the overflow measurement $O_m$ as compared to the overflow target $O_t$. $T_u$ is the update cycle length (10s). Note that the formula takes into account the number of switches in the network (z).

FIG. 7 blocks 100–104 detail the end of alert task 76 of FIG. 4. As can be seen, two tests must be positive to end the alert. First, the average occupancy $O_{av}$ must be below the predetermined threshold $\rho_1$, as represented by a yes response to the block 100. Second, RECOM must be at its floor value $R_{min}$, as represented by a yes response to the block 102.

As with $\rho_0$, it is preferred that $\rho_1$ be dependent upon the nature of the resource to which it is associated. For a target subscriber, typically $\rho_1$ is given a medium value, for instance $\rho_1 = 0.5 \, \rho_t$. For a switch, $\rho_1 = 0.8 \, \rho_t$ is typical.

The reason for the test RECOM=$R_{min}$ (the block 102) is the importance of detecting when the low measured occupancy is due to the combined effect of low traffic and unduly severe recommendations. When this happens, a less stringent recommendation is more appropriate to raise the occupancy than the ending of the alert.

When both tests are true, blocks 100 and 102, the alert flag is cleared, as represented by the block 104. This signals to the network processor that the device has no longer to be monitored, and to the switch that controls for it have no longer to be applied.

The recommendations are sent to the switches in the format shown in FIG. 8. In FIG. 8, $D_1$, $D_2$. . . are the codes of the destinations being monitored, $RECOM_1$, $RECOM_2$, . . . are their associated recommendations, and $ALERT_1$, $ALERT_2$, . . . are the alert flags. The end-of-block box (EOB) is a flag indicating the end of the list of congested resources FIG. 9 shows the processing of an outgoing call (coded x) at the switch, using the interarrival time recommendation. In the following description, a subscript i is used to indicate that the relevant variables apply to many congested destinations and are used by the switch for screening on a given cycle.

In the first step of the method, as represented by a block 120, the call is tested against each of the destinations currently in alert state ($D_i$). The calls that are not directed to a congested destination are routed as usual, as represented by a block 122. On the other hand, if the call is directed to congested destination $D_i$, the present time T is compared to the release time $T_{0i}$ associated with $D_i$, as represented by a block 124. If the release time has not yet past, the call is blocked, as represented by a block 126. Otherwise, it is routed as usual, and the release time is reset, as represented by a block 128. The new value of $T_{0i}$ is calculated as T plus the latest recommendation received from the network processor.

When a switch receives a new recommendation, it must update the release time. FIG. 10 illustrates in a flow chart how this is done. Basically, the formula:

$$T_{0i} \leftarrow T + RECOM * random[0,1]$$

uniformly spreads the call arrivals over time when it is applied in all the originating switches. The function random[0,1] generates a random number between 0 and 1. The formula:

$$T_{0i} \leftarrow T + (T_{0i} - T)*(RECOM_i/PREV-RECOM)$$

where PREV—RECOM is the recommendation of the previous cycle, has the same effect; however randomization must be performed anyway the first time a recommendation is used to avoid synchronization of release times all over the network.

Simpler formulas than the above tend to concentrate accepted calls in bursts which may result in lower performance.

Finally the end of an alert is detected by testing the alert flag and treated by putting $T_{0i}$ to a negative value.

The description thus far has dealt with the restrictive part of the congestion control system. An additional aspect of the present invention includes an expansive congestion control routing scheme allowing a maximal use of the available resources.

In accordance with the present invention the congestion control system includes an expansive control system. FIG. 11 illustrates a DCR network with an overload problem addressed by the expansive congestion control system. The DCR network includes switches 150, 152, 154, 156, 158, 160, and 162, all under the routing control of a network processor 170. For various reasons, ranging from normal traffic fluctuations to outright focused overload, it sometimes happens that the CPU of switch is especially loaded. In FIG. 11, the switch 158 represents an overloaded switch.

In operation, the expansive control system being permanently active in the DCR network, it considers the switch load as a resource in the same way as it does for trunks. That is, in the choice of an alternate route, the load of the tandem switch is taken into account together with the number of idle trunks. Therefore, as a switch load gets higher, the tandem traffic it carries is progressively pushed towards more healthy switches 152 and 162. If the congested state persists, then the restrictive control system described hereinabove is applied.

The expansive control system works on an ongoing basis. FIG. 12 illustrates in a flow chart, the steps taken by the expansive control system. Each cycle, each switch 150, 152, 154, 156, 158, 160, and 162, sends its CPU load to the network processor 170 together with its trunk idles. The network processor receives the data as represented by a block 200. The network processor then calculates the recommended tandem in the usual for the DCR system, except that the trunk idles are weighted by a call compression factor (CCF). This involves the steps of: computing the call compression factor for each switch or node, as represented by a block 202; and calculating the tandem recommendation for each origin- destination pair, as represented by a block 204. The call compression factor is an estimator of what the CPU of the switches can take as tandem traffic. Let z be the number of switches in the network, $I_{ij}$ the number of idle trunks between switches i and j, and $P_{ij}$ the protective allowance on link i-j; then the recommended tandem switching office for an origin-destination pair od, $TSO_{od}$, is calculated as: $T_{od} = \max\{\min[C_n\cdot(I_{on}-P_{un}), C_n(I_{nd}-P_{nd})]\}$ for n=1, 2, 3, . . . , z where $C_n$ is the call compression factor (CCF) of switch n. (If o-d is a handicapped origin destination pair, then Pon and Pnd are not taken into account in the formula). $C_n$ is updated at each cycle by the following feedback formula:

$$C_n \leftarrow \min\{C_n(\rho_t/\rho_n), 1\}$$

where $\rho_t$ is the predetermined target CPU occupancy and $\rho_n$ is the CPU occupancy figure received from switch n. (The network processor ensures that $\rho_t \neq 0$ before using the formula.)

Numerous modifications, variations and adaptations may be made to the particular embodiments of the invention described above without departing from the scope of the invention, which is defined in the claims.

What is claimed is:

1. In a telecommunications network having a plurality of switching offices interconnected by trunks and connected to a central processor for periodically exchanging data, with the central processor during an update cycle, to effect dynamic call routing, a method of congestion control comprising the steps of:

at the beginning of an update cycle, receiving data, from the switching offices, indicative of occupancy of network resources for updating data of the central processor;

determining from the data whether there are destinations within the network to which access is to be restricted;

establishing an alert status for each of the restricted destinations;

calculating, for each of the restricted destinations, an interval of time to be left between calls entering the network that are directed thereto and referred to as a call interarrival time; and the central processor, during the update cycle, sending, to the switching offices, an identification for each of the restricted destinations, together with the alert status and the call interarrival time therefor for updating data of the switching offices for dynamic call routing and congestion control.

2. A method as claimed in claim 1 wherein the step of establishing the alert status includes the steps of computing an average occupancy, $O_{av}$, for the current update cycle and comparing the average occupancy to a predetermined threshold, $\rho_0$.

3. A method as claimed in claim 2 wherein the step of computing an average occupancy, $O_{av}$, is in accordance with the formula:

$$O_{av} \leftarrow (1-\beta)^*O_m + \beta^*O_{av}$$

where, $O_m$ is a measured occupancy for the current update cycle, $\beta$ is a weighting factor, and $O_{av}$ is the average occupancy of all previous update cycles.

4. A method as claimed in claim 3 wherein the step of computing the average occupancy, $O_{av}$, uses a weighting factor, $\beta$ of between 0 to 1.

5. A method as claimed in claim 1 wherein the step of calculating the call interarrival time is in accordance with the formula:

$$RECOM \leftarrow \max\left( RECOM^* \frac{\rho}{\rho_t}, R_{min} \right)$$

for data of a direct occupancy measurement type, where $\rho$ is a current occupancy measurement, $\rho_t$, is a target occupancy, RECOM is a previously recommended call interarrival time and $R_{min}$ is a predetermined floor value.

6. A method as claimed in claim 5 wherein the step of calculating the call interarrival time uses a value of $R_{min}$ of about 0.1 $R_0$ where $R_0 = 1/(\lambda_{exp}/\text{number of switching offices})$ where $\lambda_{exp}$ is an expected call flow at a subscriber.

7. A method as claimed in claim 1 wherein the step of calculating the call interarrival time is in accordance with the formula:

$$RECOM \leftarrow \max\left( \frac{1}{[(O_t - O_m)/T_U]/z + 1/RECOM}, R_{min} \right)$$

for data representing a rate of calls overflowing, where $O_m$ is a current overflow measurement, $O_t$ is a target overflow, RECOM is a previously recommended call interarrival time, $T_U$ is the data exchanging period, z is the number of switching offices in the network and $R_{min}$ is a predetermined floor value.

8. A method as claimed in claim 1 further comprising the steps of, for each of the plurality of switching offices, receiving the identification for each of the restricted destinations, together with the alert status and the call interarrival time therefor, from the central processor, and staggering application of the call interarrival time for each destination having an alert status.

9. A method as claimed in claim 8 wherein the step of staggering application of the call interarrival time for each destination having an alert status includes, if a previous call release time exists, generating a release time in accordance with the formula:

$$T_{0i} \leftarrow T + (T_{0i} - T)^*(RECOM_i/PREV—RECOM)$$

where T is the present time, $T_{0i}$ is the previous release time at switch i, RECOM is the current call interarrival time recommendation and PREV—RECOM is the recommendation of the previous update cycle; otherwise, generating a release time in accordance with the formula: $T_{0i} \leftarrow T + RECOM^*random[0,1]$, where random [0,1] is a random number generator which picks a number between 0 and 1.

10. In a telecommunications network having a plurality of switching offices interconnected by trunks and connected to a central processor for periodically exchanging data, with the central processor during an update cycle, to effect dynamic call routing, a method of congestion control comprising the steps of:

at the beginning of an update cycle, receiving data, from the switching offices, indicative of occupancy of network resources for updating data of the central processor;

for each origin-destination pair of the plurality of switching offices, recommending a tandem switching office in dependence upon occupancy of trunks to the switching office and CPU occupancy of the switching office;

determining from the data whether there are destinations within the network to which access is to be restricted;

establishing an alert status for each of the restricted destinations;

calculating, for each of the restricted destinations an interval of time to be left between calls entering the network that are directed thereto and referred to as a call interarrival time; and the central processor, during the update cycle, sending, to the switching offices, an identification for each of the restricted destinations, together with the alert status and the call interarrival time therefor for updating data of the switching offices for dynamic call routing and congestion control.

11. A method as claimed in claim 10 wherein the step of recommending a tandem switching office TSO, for an origin-destination pair od, is in accordance with the following:

$$TSO = \max\{\min[C_n(l_{[0]on} - P_{[0]on}), C_n(l_{nd} - P_{nd})]\} \text{ for } n = 1, 2, 3, \ldots, z$$

where $C_n$ is a call compression factor (CCF) of switching office n, z is the number of switching offices in the network, $l_{ij}$ is the number of idle trunks between switching offices i and j, and $P_{ij}$ is a predetermined protective allowance on the trunks between switching offices i and j.

12. A method as claimed in claim 11 wherein in the step of recommending a tandem switching office, for each update cycle, for each switching office n, $C_n$ is updated with the following:

$$C_n \leftarrow \min \{C_n(\rho_t/\rho_n), 1\}$$

where $\rho_t$ is a predetermined CPU occupancy and $\rho_n$ is the CPU occupancy received from switching office n.

* * * * *